3,133,093
2,4-DIBROMO-9-HALO-ALLOPREGNANES
Lewis H. Sarett, Princeton, N.J., assignor to Merck & Co., Inc., Rahway, N.J., a corporation of New Jersey
No Drawing. Continuation of application Ser. No. 511,404, May 26, 1955. This application June 21, 1961, Ser. No. 118,494
8 Claims. (Cl. 260—397.45)

This invention is concerned generally with novel steroid compounds and processes of preparing them. More particularly, it relates to 9-halo derivatives of $\Delta^{1,4}$-3,20-diketo - 17 - hydroxy - 11,21 - bisoxygenated-pregnadiene compounds, and to processes of preparing these compounds starting with 9-halo cortisone and 9-halo hydrocortisone. These novel 9-halo-$\Delta^{1,4}$-3,20-diketo-17-hydroxy - 11,21 - bis-oxygenated-pregnadiene compounds (hereinafter sometimes referred to in this application as 9-halo-retrocortin compounds) possess cortisone activity, but differ from cortisone and hydrocortisone in not possessing sodium or water retention action. These novel 9-halo derivatives of $\Delta^{1,4}$-3,20-diketo-17-hydroxy-11,21-bis-oxygenated-pregnadiene compounds are especially effective in the treatment of arthritis and related diseases since they can be administered for their cortisone action without producing the undesired metabolic effects such as edema, which are caused by the sodium and water retention action of cortisone.

This application is a continuation of application Serial No. 511,404, filed on May 26, 1955, now abandoned which is in turn a continuation-in-part of applications Serial Nos. 481,955, now abandoned; 481,956, now U.S. Patent No. 2,736,734 and 481,957, now U.S. Patent No. 2,789,117, all filed on January 14, 1955.

These novel 9-halo derivatives of $\Delta^{1,4}$-3,20-diketo-17-hydroxy - 11,21 - bis-oxygenated-pregnadiene compounds, subject of the present invention, may be chemically represented as follows:

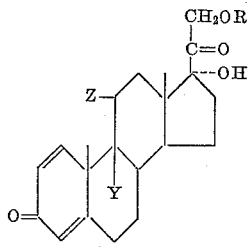

wherein R is hydrogen or an acyl radical, Z is a keto or hydroxy radical, and Y is a halogen substituent.

These 9 - halo - $\Delta^{1,4}$ - 3,20 - diketo - 17 - hydroxy - 11, 21-bis-oxygenated-pregnadiene compounds can be prepared by reacting a 9-halo-3,20-diketo-11-oxygenated-17-hydroxy-21-acyloxy-allopregnane compound (Compound 1 hereinbelow) with approximately 2 molecular equivalents of bromine to form the corresponding 2,4-dibromo-9 - halo - 3,20 - diketo - 11 - oxygenated - 17 - hydroxy-21-acyloxy-allo-pregnane (Compound 2); the latter compound is reacted with a dehydrohalogenating agent to produce a 9-halo-$\Delta^{1,4}$-3,20-diketo-11-oxygenated-17-hydroxy-21-acyloxy-pregnadiene (Compound 3) which upon reaction with a hydrolyzing agent is converted to the corresponding 9 - halo - $\Delta^{1,4}$ - 3,20 - diketo - 11 - oxygenated-17,21-dihydroxy-pregnadiene (Compound 4). The reactions indicated hereinabove may be chemically represented as follows:

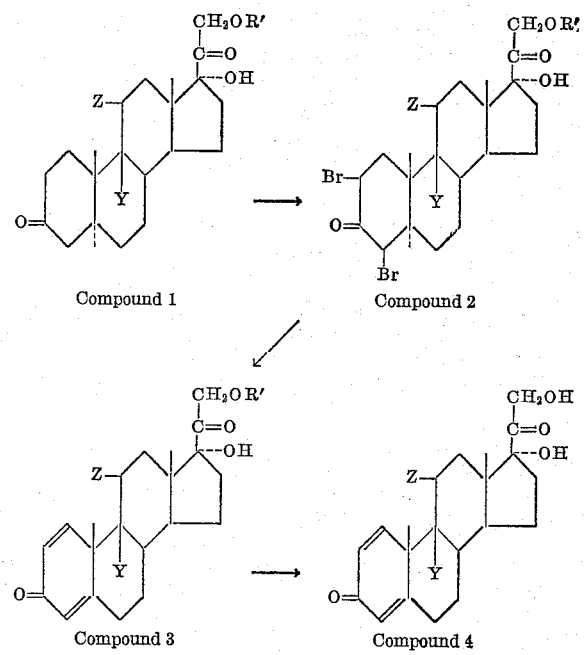

Compound 1   Compound 2

Compound 3   Compound 4 wherein R' is acyl, and Z and Y have the significance above-defined.

The 9 - halo - 3,20 - diketo - 11 - oxygenated - 17 - hydroxy-21-acyloxy-allopregnane compounds used as starting materials in the foregoing procedure include 9-halo-3,11,20 - triketo - 17 - hydroxy - 21 - acyloxy - allopregnane compounds as for example 9α-chloro-3,11,20-triketo - 17α - hydroxy - 21 - acyloxy - allopregnanes, such as 9α - chloro - 3,11,20 - triketo - 17α,21 - dihydroxy-allopregnane 21-acetate, 9α-chloro-3,11,20-triketo-17α, 21-dihydroxy-allopregnane 21-propionate, 9α-fluoro-3,11, 20 - triketo - 17α - hydroxy - 21 - acyloxy - allopregnanes such as 9α-fluoro-3,11,20-triketo-17α,21-dihydroxy-allopregnane 21-acetate, 9α-fluoro-3,11,20-triketo-17α,21-dihydroxy-allopregnane 21-propionate, 9α-fluoro-3,11,20-triketo - 17α,21 - dihydroxy - allopregnane 21 - (tertiary butyl-acetate), 9α - fluoro - 3,11,20 - triketo - 17α,21-dihydroxy-allopregnane 21-phosphate, 9-halo-3,20-diketo-11,17-dihydroxy-21-acyloxy-allopregnane compounds as for example 9α-chloro-3,20-diketo-11β,17α-dihydroxy-21-acyloxy-allopregnanes such as 9α-chloro-3,20-diketo-11β, 17α,21 - trihydroxy - allopregnane 21 - acetate, 9α-chloro-3,20 - diketo - 11β,17α,21 - trihydroxy-allopregnane 21-propionate, 9α - fluoro - 3,20 - diketo - 11β,17α - dihydroxy-21-acyloxy-allopregnanes such as 9α-fluoro-3,20-diketo - 11β,17α,21 - trihydroxy - allopregnane 21 - acetate, 9α - fluoro - 3,20 - diketo - 11β,17α,21 - trihydroxy-allopregnane 21-propionate, 9α-fluoro-3,20-diketo-11β, 17α,21 - trihydroxy-allopregnane 21 - (tertiary butyl-acetate), 9α - fluoro - 3,20 - diketo - 11β,17α,21 - trihydroxy-allopregnane 21-phosphate, and the like.

These 9 - halo - 3,11,20 - triketo - 17 - hydroxy - 21-acyloxy-allopregnanes and 9-halo-3,20-diketo-11,17-dihydroxy-21-acyloxy-allopregnanes are conveniently prepared by reacting the corresponding esters of cortisone and hydrocortisone, i.e. 9α-halo-Δ⁴-3,11,20-triketo-17α-hydroxy-21-acyloxy-pregnene and 9α-halo-Δ⁴-3,20-diketo-11β,17α - dihydroxy - 21 - acyloxy-pregnene, with hydrogen in the presence of a palladium catalyst whereby the double bond connecting the C–4 and C–5 carbon atoms is hydrogenated to produce the corresponding allopregnane compounds without substantially affecting other reducible bonds in the molecule.

The bromination reaction is ordinarily carried out, in accordance with the present invention, by dissolving the 9-halo-3,20-diketo - 11 - oxygenated-17-hydroxy-21-acyloxy-allopregnane compound in a solvent inert to bromine, as for example a halogenated hydrocarbon such as chloroform, carbon tetrachloride, glacial acetic acid, and the like, and adding the bromine to the resulting solution. It is preferred to conduct the bromination at room temperature by adding a solution of bromine in chloroform or glacial acetic acid, dropwise, to a solution of the 9-halo-3,20-diketo-11-oxygenated-17-hydroxy-21-acyloxy-allopregnane in chloroform containing a small amount of hydrogen bromide. The product is conveniently recovered from the bromination mixture by evaporating the solvent; the residual material may be purified, if desired, by recrystallization from a solvent such as ethyl acetate to give the 2,4-dibromo-9-halo-3,20-diketo-11-oxygenated-17-hydroxy-21-acyloxy-allopregnane compounds as for example 2,4-dibromo-9-halo-3,11,20-triketo-17-hydroxy-21-acyloxyallopregnanes such as 2,4-dibromo-9α-chloro-3,11,20-triketo-17α-hydroxy-21-acyloxy-allopregnane,
2,4-dibromo-9α-chloro-3,11,20-triketo-17α,21-dihydroxy-allopregnane 21-acetate,
2,4-dibromo-9α-chloro-3,11,20-triketo-17α,21-dihydroxy-allopregnane 21-propionate,
2,4-dibromo-9α-fluoro-3,11,20-triketo-17α-hydroxy-21-acyloxy-allopregnane,
2,4-dibromo-9α-fluoro-3,11,20-triketo-17α,21-dihydroxy-allopregnane 21-acetate,
2,4-dibromo-9α-fluoro-3,11,20-triketo-17α,21-dihydroxy-allopregnane 21-propionate,
2,4-dibromo-9α-fluoro-3,11,20-triketo-17α,21-dihydroxy-allopregnane 21-(tertiary butyl-acetate),
2,4-dibromo-9α-fluoro-3,11,20-triketo-17α,21-dihydroxy-allopregnane 21-phosphate,
2,4-dibromo-9-halo-3,20-diketo - 11,17 - dihydroxy - 21-acyloxy-allopregnanes such as
2,4-dibromo-9α-chloro-3,20-diketo-11β,17α-dihydroxy-21-acyloxy-allopregnane,
2,4-dibromo-9α-chloro-3,20-diketo-11β,17α,21-trihydroxy-allopregnane 21-acetate,
2,4-dibromo-9α-chloro-3,20-diketo-11β,17α,21-trihydroxy-allopregnane 21-propionate,
2,4-dibromo-9α-fluoro-3,20-diketo-11β,17α-dihydroxy-21-acyloxy-allopregnane,
2,4-dibromo-9α-fluoro-3,20-diketo-11β,17α,21-trihydroxy-allopregnane 21-acetate,
2,4-dibromo-9α-fluoro-3,20-diketo-11β,17α,21-trihydroxy-allopregnane 21-propionate,
2,4-dibromo-9α-fluoro-3,20-diketo-11β,17α,21-trihydroxy-allopregnane 21-(tertiary butyl-acetate),
2,4-dibromo-9α-fluoro-3,20-diketo-11β,17α,21-trihydroxy-allopregnane 21-phosphate,
and the like.

The dehydrohalogenation of the 2,4-dibromo-9-halo-3,20-diketo-11-oxygenated - 17 - hydroxy-21-acyloxy-allopregnane compound thus formed can be carried out by reacting the 2,4-dibromo compound with a tertiary amine such as pyridine, collidine, and the like. If desired, a nitrogenous ketone reagent such as 2,4-dinitrophenylhydrazine, semicarbazide, and the like, can be utilized as the dehydrohalogenating agent. When a tertiary amine is utilized as the dehydrohalogenating agent, the reaction is conveniently conducted by heating the reactants (the 2,4-dibromo-9-halo - 3,20 - diketo - 11 - oxygenated-17-hydroxy-21-acyloxy-allopregnane and the tertiary amine) under reflux for a period of about one hour, thereby forming the corresponding 9-halo-Δ¹,⁴-3,20-diketo-11-oxygenated-17-hydroxy - 21 - acyloxy-pregnadiene compound. This product is conveniently recovered from the reaction mixture by cooling the mixture and pouring it into ice water whereupon the 9-halo-Δ¹,⁴-3,20-diketo-11-oxygenated-17-hydroxy - 21 - acyloxy-pregnadiene ordinarily precipitates and is recovered by filtration. In the case of the phosphate esters (i.e. the 9-halo-Δ¹,⁴-3,20-diketo - 11 - oxygenated - 17,21 - dihydroxy - pregnadiene 21-phosphates) which are relatively soluble in water, the dilution of the reaction mixture with water gives an aqueous solution which is first contacted with an excess of a sulfonic type cation exchange resin on the hydrogen cycle (thereby adsorbing the tertiary amine from the solution) and then contacted with an anion-exchange resin to adsorb bromide ion. Evaporation of the resulting aqueous solution to dryness gives the desired 9-halo-Δ¹,⁴-3,20-diketo-11-oxygenated - 17,21 - dihydroxy-pregnadiene 21-phosphate.

When a nitrogenous ketone reagent (such as 2,4-dinitrophenylhydrazine or semicarbazide) is employed for the 2,4-dibromo-9-halo-3,20-diketo-11-oxygenated-17-hydroxy-21-acyloxy-allopregnane is preferably brought into contact with the 2,4-dinitrophenylhydrazine or semicarbazide reagent in a medium comprising glacial acetic acid, at a temperature of about 50–55° C., thereby forming the intermediate 3-(2,4-dinitrophenylhydrazone) or 3-semicarbazone of the 9-halo-Δ¹,⁴-3,20-diketo-11-oxygenated-17-hydroxy-21-acyloxy-pregnadiene; the glacial acetic acid reaction mixture is then diluted with water and cooled, whereupon the 3-(2,4-dinitrophenylhydrazone) or 3-semicarbazone precipitates, and is recovered by filtration and dried. The 3-(2,4-dinitrophenylhydrazone) or 3-semicarbazone is hydrolyzed, without further purification, by heating, in glacial acetic acid solution in the presence of a carbonyl acceptor such as pyruvic acid, at an elevated temperature of approximately 80–85° C., thereby forming the corresponding 9-halo-Δ¹,⁴-3,20-diketo - 11 - oxygenated - 17 - hydroxy-21-acyloxy-pregnadiene compound.

The 9-halo-Δ¹,⁴-3,20-diketo-11-oxygenated-17-hydroxy-21-acyloxy-pregnadiene compounds obtained in accordance with the foregoing dehydrohalogenation procedures include 9-halo-Δ¹,⁴-3,11,20-triketo - 17 - hydroxy-21-acyloxy-pregnadiene compounds as for example 9α-chloro-Δ¹,⁴-3,11,20-triketo - 17α - hydroxy - 21 - acyloxy-pregnadienes such as 9α-chloro-Δ¹,⁴-3,11,20-triketo-17α,21-dihydroxy-pregnadiene 21-acetate, 9α-chloro-Δ¹,⁴-3,11,20-triketo - 17α,21 - dihydroxy-pregnadiene 21-propionate, 9α-fluoro - Δ¹,⁴-3,11,20 - triketo - 17α - hydroxy 21-acyloxy-pregnadienes such as 9α-fluoro-Δ¹,⁴-3,11,20-triketo-17α,21-dihydroxy-pregnadiene 21-acetate, 9α-fluoro-Δ¹,⁴-3,11,20-triketo-17α,21-dihydroxy-pregnadiene 21 - propionate, 9α-fluoro-Δ¹,⁴-3,11,20-triketo - 17α,21 - dihydroxy - pregnadiene 21-(tertiary butyl-acetate), 9α-fluoro-Δ¹,⁴-3,11,20-triketo-17α,21-dihydroxy-pregnadiene 21 - phosphate, 9-halo-Δ¹,⁴-3,20-diketo - 11,17 - dihydroxy - 21 - acyloxy-pregnadiene compounds as for example 9α-chloro-Δ¹,⁴-3,20-diketo - 11β,17α - dihydroxy-21-acyloxy-pregnadienes such as 9α-chloro-Δ¹,⁴-3,20-diketo-11β,17α,21-trihydroxy-pregnadiene 21 - acetate, 9α-chloro-Δ¹,⁴-3,20-diketo-11β,17α,21-trihydroxy-pregnadiene 21-propionate, 9α-fluoro-Δ¹,⁴-3,20-diketo - 11β,17α - dihydroxy-21-acyloxy-pregnadienes such as 9α-fluoro-3,20-diketo-11β,17α,21-trihydroxy-pregnadiene 21 - acetate, 9α-fluoro-3,20-diketo-11β,17α,21-trihydroxy-pregnadiene 21-propionate, 9α-fluoro-3,20-diketo - 11β,17α,21 - trihydroxy-pregnadiene 21-(tertiary butyl-acetate), 9α-fluoro-3,20-diketo-11β,17α,21-trihydroxy-pregnadiene 21-phosphate.

The 9-halo-Δ¹,⁴-3,20-diketo-11-oxygenated -17-hydroxy-21-acyloxy-pregnadiene compound may then be reacted with a hydrolyzing agent as for example a solution of an alkali metal hydroxide such as potassium hydroxide in a lower alkanol, such as ethanol or methanol, to form the corresponding 9-halo-$\Delta^{1,4}$-3,20-diketo-11-oxygenated-17,21-dihydroxy-pregnadiene compound. This hydrolysis is preferably conducted by dissolving the 9-halo-$\Delta^{1,4}$-3,20-diketo-11-oxygenated-17-hydroxy-21-acyloxy-pregnadiene compound in a mixture of benzene and methanolic potassium hydroxide, and allowing the resulting solution to stand at room temperature for a period of about ten minutes; at the end of this hydrolysis period, the solution is acidified with acetic acid, and the benzene is evaporated in vacuo to give the corresponding 9-halo-$\Delta^{1,4}$-3,20-diketo-11-oxygenated-17,21-dihydroxy-pregnadiene compound. The 9-halo-$\Delta^{1,4}$-3,20-diketo-11-oxygenated-17,21-dihydroxy-pregnadiene compounds obtained in accordance with this hydrolysis procedure include 9-halo-$\Delta^{1,4}$-3,11,20-triketo-17,21-dihydroxy-pregnadienes such as 9$\alpha$-chloro-$\Delta^{1,4}$-3,11,20-triketo-17$\alpha$,21-dihydroxy-pregnadiene, 9$\alpha$-fluoro-$\Delta^{1,4}$-3,11,20-triketo-17$\alpha$,21-dihydroxy-pregnadiene, 9-halo-$\Delta^{1,4}$-3,20-diketo-11,17-21-trihydroxy-pregnadienes such as 9$\alpha$-chloro-$\Delta^{1,4}$-3,20-diketo-11$\beta$,17$\alpha$,21-trihydroxy-pregnadiene, 9$\alpha$-fluoro-$\Delta^{1,4}$-3,20-diketo-11$\beta$,17$\alpha$,21-trihydroxy-pregnadiene, and the like.

The 9-halo-$\Delta^{1,4}$-3,11,20-triketo-17,21-dihydroxy-pregnadienes and 9-halo-$\Delta^{1,4}$-3,20-diketo-11,17,21-trihydroxy-pregnadienes thus obtained can be reacted, if desired, with an acylating agent as for example a lower alkanoic anhydride such as acetic anhydride, propionic anhydride, tertiary butyl-acetyl chloride, and the like, in the presence of a tertiary amine such as pyridine thereby producing the corresponding 9-halo-$\Delta^{1,4}$-3,11,20-triketo-17-hydroxy-21-alkanoyloxy-pregnadiene and 9-halo-$\Delta^{1,4}$-3,20-diketo-11,17-dihydroxy-21-alkanoyloxy-pregnadiene.

The following examples illustrate methods of carrying out the present invention, but it is to be understood that these examples are given for purposes of illustration and not of limitation.

*Example 1*

202 mg. of 9$\alpha$-fluoro-3,11,20-triketo-17$\alpha$-hydroxy-21-acetoxy-allopregnane is dissolved in 15 cc. of chloroform, and to the resulting mixture is added dropwise 4.3 cc. of a 0.0011 N chloroform solution of bromine in 10 cc. of chloroform. This solution is allowed to stand at room temperature for about 15 hours, and the chloroform solution evaporated to dryness in vacuo to give 2,4-dibromo-9$\alpha$-fluoro-3,11,20-triketo-17$\alpha$-hydroxy-21-acetoxy-allopregnane.

This 2,4-dibromo compound is dissolved, without purification, in 25 cc. of glacial acetic acid and to the solution is added 282 mg. of 2,4-dinitrophenylhydrazine. The resulting solution is heated under nitrogen at 50–55° C. for two hours, and the reaction solution is worked up in the conventional manner to give the desired $\Delta^{1,4}$-3,11,20-triketo-17$\alpha$-hydroxy-21-acetoxy-pregnadiene 3-(2,4-dinitrophenylhydrazone). This crude hydrazone is mixed with 17.5 cc. of 90% aqueous pyruvic acid and 3.5 cc. of glacial acetic acid, and the mixture is heated under nitrogen, with agitation, at a temperature of about 80–85° C. for a period of approximately five and one-half hours. (A clear solution is obtained after heating the mixture for a period of approximately 45 minutes.) The reaction solution is evaporated in vacuo to a small volume, and the residual solution is diluted with a large quantity of chloroform. The solid material which precipitates is removed by filtration, and the chloroform filtrate is extracted with two portions of water, with three portions of dilute aqueous potassium bicarbonate solution, and finally with another portion of water. Evaporation of this washed chloroform solution to dryness gives $\Delta^{1,4}$-9$\alpha$-fluoro-3,11,20-triketo-17$\alpha$,21-dihydroxy-pregnadiene. This material is reacted with acetic anhydride and pyridine to give $\Delta^{1,4}$-9$\alpha$-fluoro-3,11,20-triketo-17$\alpha$-hydroxy-21-acetoxy-pregnadiene (sometimes referred to herein as 9$\alpha$-fluoro-retrocortin 21-acetate).

The 9$\alpha$-fluoro-3,11,20-triketo-17$\alpha$-hydroxy-21-acetoxy-allopregnane used as starting material in this example may be prepared starting with 9$\alpha$-fluoro cortisone acetate ($\Delta^4$-9$\alpha$-fluoro-3,11,20-triketo-17$\alpha$-hydroxy-21-acetoxy-pregnene) as follows: 600 mg. of palladium oxide are added to a suspension of 7.25 g. of said $\Delta^4$-9$\alpha$-fluoro-3,11,20-triketo-17$\alpha$-hydroxy-21-acetoxy-pregnene in 600 cc. of methanol, and the mixture is reacted with hydrogen at a pressure of about 40 pounds per square inch while maintaining the reactants at about room temperature. The absorption of hydrogen ceases after about one-half hour; the amount of hydrogen absorbed corresponds to one mole. The reaction mixture is filtered, thereby removing the catalyst, and the catalyst is washed thoroughly with chloroform. A few drops of ethanolic hydrogen chloride are added to the combined filtrate and washings, and the resulting solution is evaporated to dryness in vacuo. The residual material is dissolved in chloroform, and the solution is again evaporated to dryness. The residual material is then recrystallized twice from acetone to give about 6 grams of substantially pure 9$\alpha$-fluoro-3,11,20-triketo-17$\alpha$-hydroxy-21-acetoxy-allopregnane (sometimes referred to herein as 9$\alpha$-fluoro-retrocortane 21-acetate).

*Example 2*

Similarly, 9$\alpha$-fluoro-hydrocortisone acetate is hydrogenated to give 9$\alpha$-fluoro-3,20-diketo-11$\beta$,17$\alpha$-dihydroxy-21-acetoxy-allopregnane which, upon reaction with bromine in accordance with the foregoing procedure, is converted to 2,4-dibromo-9$\alpha$-fluoro-3,20-diketo-11$\beta$,17$\alpha$-dihydroxy-21-acetoxy-allopregnane. The latter is then reacted with 2,4-dinitrophenylhydrazine and the intermediate 2,4-dinitrophenyl-hydrazone is hydrolyzed in the presence of pyruvic acid to give $\Delta^{1,4}$-9$\alpha$-fluoro-3,20-diketo-11$\beta$,17$\alpha$,21-trihydroxy-pregnadiene. This material is reacted with acetic anhydride and pyridine in accordance with the conventional method to give $\Delta^{1,4}$-9$\alpha$-fluoro-3,20-diketo-11$\beta$,17$\alpha$-dihydroxy-21-acetoxy-pregnadiene (sometimes referred to herein as 9$\alpha$-fluoro-hydro-retrocortin 21-acetate).

The details of the procedure outlined hereinabove are as follows: 202 mg. of 9$\alpha$-fluoro-3,20-diketo-11$\beta$,17$\alpha$-dihydroxy-21-acetoxy-allopregnane is dissolved in 15 cc. of chloroform, and to the resulting mixture is added dropwise 4.3 cc. of a 0.0011 N chloroform solution of bromine in 10 cc. of chloroform. This solution is allowed to stand at room temperature for about fifteen hours, and the chloroform solution evaporated to dryness in vacuo to give 2,4-dibromo-9$\alpha$-fluoro-3,20-diketo-11$\beta$,17$\alpha$-dihydroxy-21-acetoxy-allopregnane.

This 2,4-dibromo compound is dissolved, without purification, in 25 cc. of glacial acetic acid and to the solution is added 282 mg. of 2,4-dinitrophenylhydrazine. The resulting solution is heated under nitrogen at 50–55° C. for two hours, and the reaction solution is worked up in the conventional manner to give the desired $\Delta^{1,4}$-3,20-diketo-11$\beta$,17$\alpha$-dihydroxy-21-acetoxy-pregnadiene 3-(2,4-dinitrophenylhydrazone). This crude hydrazone is mixed with 17.5 cc. of 90% aqueous pyruvic acid and 3.5 cc. of glacial acetic acid, and the mixture is heated under nitrogen, with agitation, at a temperature of about 80–85° C. for a period of approximately five and one-half hours. (A clear solution is obtained after heating the mixture for a period of approximately forty-five minutes.) The reaction solution is evaporated in vacuo to a small volume, and the residual solution is diluted with a large quantity of chloroform. The solid material which precipitates is removed by filtration, and the chloroform filtrate is extracted with two portions of water, with three portions of dilute aqueous potassium bicarbonate solution, and finally with another portion of water. Evaporation of this washed chloroform solution to dryness gives $\Delta^{1,4}$-9$\alpha$-fluoro-3,20-diketo-11$\beta$,17$\alpha$,21-trihydroxy-pregnadiene. This material is reacted with acetic anhydride and pyridine to give $\Delta^{1,4}$-9α-fluoro-3,20-diketo-11β, 17α-dihydroxy-21-acetoxy-pregnadiene.

The 9α-fluoro-3,20-diketo-11β,17α-dihydroxy-21-acetoxy-allopregnane used as starting material in this example may be prepared starting with 9α-fluoro-hydrocortisone acetate ($\Delta^4$-9α-fluoro-3,20-diketo-11β,17α-dihydroxy-21-acetoxy-pregnane) as follows: 600 mg. of palladium oxide are added to a suspension of 7.25 g. of said $\Delta^4$-9α-fluoro-3,20-diketo-11β,17α-dihydroxy-21-acetoxy-pregnane in 600 cc. of methanol. The mixture is reacted with hydrogen at a pressure of about 40 pounds per square inch while maintaining the reactants at about room temperature. The absorption of hydrogen ceases after about one-half hour; the amount of hydrogen absorbed corresponds to one mole. The reaction mixture is filtered, thereby removing the catalyst, and the catalyst is washed thoroughly with chloroform. A few drops of ethanolic hydrogen chloride are added to the combined filtrate and washings, and the resulting solution is evaporated to dryness in vacuo. The residual material is dissolved in chloroform, and the solution is again evaporated to dryness. The residual material is then recrystallized twice from acetone to give about 6 grams of substantially pure 9α-fluoro-3,20-diketo-11β,17α-dihydroxy-21-acetoxy-allopregnane (sometimes referred to herein as 9α-fluoro-hydro-retrocortane 21-acetate).

*Example 3*

One gram of 9α-fluoro-3,20-diketo-11β,17α-dihydroxy-21-acetoxy-allopregnane is dissolved in 35 cc. of glacial acetic acid, and to this solution is added five drops of an 0.95 N solution of hydrogen bromide in glacial acetic acid. To this solution is added a glacial acetic acid solution containing two molecular equivalents of bromine (based on the steroid compound) and, after the uptake of bromine is complete, an additional 6 cc. of the 0.95 N solution of hydrogen bromide in glacial acetic acid is added. The resulting solution is maintained at room temperature for a period of approximately two and one-half hours. The reaction mixture is poured into water, and the precipitated material is recovered by filtration and dried to give 2,4-dibromo-9α-fluoro-3,20-diketo-11β,17α-dihydroxy-21-acetoxy-allopregnane.

The 2,4-dibromo-9α-fluoro-3,20-diketo-11β,17α-dihydroxy-21-acetoxy-allopregnane thus obtained is mixed with 2 cc. of collidine and 5 cc. of dimethylformamide and the mixture is heated under reflux for a period of about 100 minutes. The reaction mixture is cooled and distributed between dichloromethane and dilute aqueous hydrochloric acid solution. The dichloromethane layer is washed with dilute aqueous hydrochloric acid solution and then with water until neutral and free of dimethylformamide. The solvent is evaporated from the washed dichloromethane layer in vacuo, and the residual material is purified chromatographically to give substantially pure $\Delta^{1,4}$-9α-fluoro-3,20-diketo-11β,17α-dihydroxy-21-acetoxy-pregnadiene; M.P. 237° C.; $[\alpha]_D$+100.9° in acetone; ultraviolet absorption spectrum: λ max. in methanol=239 mμ (log E 4.19); λ max. in sulfuric acid=310 mμ (log E 4.06) and 262.5 mμ (log E 4.18); infrared absorption spectrum: λ max.=2.92μ, 3.02μ, 5.74μ, 5.82μ, 6.0μ, 6.12μ, 6.21μ, 11.18μ.

*Example 4*

Eight grams of 2,4-dibromo-9α-fluoro-3,20-diketo-11β, 17α-dihydroxy-21-acetoxy-allopregnane is mixed with 18 cc. of collidine and 45 cc. of dimethylformamide, and the mixture is heated under reflux for a period of about 100 minutes. The reaction mixture is cooled and distributed between chloroform and 2.5 N aqueous hydrochloric acid solution. The chloroform layer is washed with dilute aqueous hydrochloric acid solution, with 5% aqueous sodium bicarbonate solution, and then with water until neutral until free of dimethylformamide. The solvent is evaporated from the washed chloroform layer in vacuo to give 6.19 g. of crude $\Delta^{1,4}$-9α-fluoro-3,20-diketo-11β,17α-dihydroxy-21-acetoxy-pregnadiene. 6.15 g. of this crude $\Delta^{1,4}$-9α-fluoro-3,20-diketo-11β,17α-dihydroxy-21-acetoxy-pregnadiene is dissolved in 135 cc. of 2:1 benzene:chloroform mixture, and the resulting solution passed through a column of 258 g. of neutral alumina. The resulting adsorbate is eluted with chloroform, the chloroform eluate is evaporated to dryness in vacuo, and the residual material is recrystallized from acetone to give substantially pure $\Delta^{1,4}$-9α-fluoro-3,20-diketo-11β,17α-dihydroxy-21-acetoxy-pregnadiene; M.P. 236° C.; $[\alpha]_D$+100.9° in acetone; ultra-violet absorption spectrum: λ max. in methanol=239 mμ (ε 15,400), λ max. in sulfuric acid=310 mμ (ε 10,400) and 263 mμ (ε 13,300). Anal. calcd. for $C_{23}H_{29}O_6F$: C, 65.70; H, 6.95; found: C, 65.66; H, 6.74.

The 2,4-dibromo-9α-fluoro-3,20-diketo-11β,17α-dihydroxy-21-acetoxy-allopregnane starting material may be prepared as follows: 6.0 g. of 5% palladium on charcoal catalyst are added to a suspension of 7.25 g. of $\Delta^4$-9α-fluoro-3,20-diketo-11β,17α,21-trihydroxy-pregnene 21-acetate in 750 cc. of methanol, and the mixture is reacted with hydrogen at atmospheric pressure while maintaining the reactants at about room temperature. The absorption of hydrogen ceases after about 15 minutes; the amount of hydrogen absorbed corresponds to one mole. The reaction mixture is filtered, thereby removing the catalyst, and the catalyst is washed thoroughly with methanol. The combined filtrate and washings are evaporated to dryness, and the residual material is recrystallized from acetone to give about 4 g. of 9α-fluoro-3,20-diketo-11β,17α-dihydroxy-21-acetoxy-allopregnane. One gram of this 9α-fluoro-3,20-diketo-11β,17α-dihydroxy-21-acetoxy-allopregnane is dissolved in 35 cc. of glacial acetic acid, and to this solution is added a few drops of a one normal glacial acetic acid solution of hydrogen bromide. To this solution is added a glacial acetic acid solution containing two molar equivalents of bromine; after the absorption of bromine is complete, about 6 cc. of an approximately 1 N solution of HBr in acetic acid is added, and the solution is held at about 20° C. for 2½ hours. The reaction mixture is poured into water, and the precipitated material is recovered by filtration and dried to give 2,4-dibromo-9α-fluoro-3,20-diketo-11β,17α-dihydroxy-21-acetoxy-allopregnane.

*Example 5*

0.5 g. of $\Delta^{1,4}$-9α-fluoro-3,20-diketo-11β,17α-dihydroxy-21-acetoxy-pregnadiene is dissolved in a mixture of 5 cc. of benzene and 5 cc. of 1.1 N methanolic potassium hydroxide, and the solution is allowed to stand at room temperature for a period of about ten minutes. The resulting solution is acidified with acetic acid, the benzene is evaporated in vacuo, and the residual material is recrystallized from ethyl acetate to give substantially pure $\Delta^{1,4}$-9α-fluoro-3,20-diketo-11β,17α,21-trihydroxy-pregnadiene (sometimes referred to herein as 9α-fluoro-hydro-retrocortin).

*Example 6*

One gram of 9α-fluoro-3,11,20-triketo-17α-hydroxy-21-acetoxy-allopregnane is dissolved in 35 cc. of glacial acetic acid, and to this solution is added five drops of an 0.95 N solution of hydrogen bromide in glacial acetic acid. To this solution is added a glacial acetic acid solution containing two molecular equivalents of bromine (based on the steroid compound) and, after the uptake of bromine is complete, an additional 6 cc. of the 0.95 N solution of hydrogen bromide in glacial acetic acid is added. The resulting solution is maintained at room temperature for a period of approximately 2½ hours. The reaction mixture is poured into water, and the precipitated material is recovered by filtration and dried to give 2,4-dibromo-9α-fluoro-3,11,20-triketo-17α-hydroxy-21-acetoxy-allopregnane.

The 2,4-dibromo-9α-fluoro-3,11,20-triketo-17α-hydroxy- 21-acetoxy-allopregnane thus obtained is mixed with 2 cc. of collidine and 5 cc. of dimethyl-formamide and the mixture is heated under reflux for a period of about 100 minutes. The reaction mixture is cooled and distributed between dichloromethane and dilute aqueous hydrochloric acid solution. The dichloromethane layer is washed with dilute aqueous hydrochloric acid solution and then with water until neutral and free of dimethyl formamide. The solvent is evaporated from the washed dichloromethane layer in vacuo, and the residual material is purified chromatographically to give substantially pure $\Delta^{1,4}$-9α-fluoro-3,11,20-triketo-17α-hydroxy-21-acetoxy-pregnadiene.

0.5 g. of $\Delta^{1,4}$-9α-fluoro-3,11,20-triketo-17α-hydroxy-21-acetoxy-pregnadiene is dissolved in a mixture of 5 cc. of benzene and 5 cc. of 1.1 N methanolic potassium hydroxide, and the solution is allowed to stand at room temperature for a period of about ten minutes. The resulting solution is acidified with acetic acid, the benzene is evaporated in vacuo, and the residual material is recrystallized from ethyl acetate to give substantially pure $\Delta^{1,4}$-9α-fluoro-3,11,20-triketo-17α,21-dihydroxy-pregnadiene (sometimes referred to herein as 9α-fluoro-retrocortin).

*Example 7*

Fifty parts of reagent glacial acetic acid are added to a solution of 0.5 part of 9α-fluoro-3,11,20-triketo-17α,21-dihydroxy-allopregnane 21-phosphate (sometimes referred to herein as 9α-fluoro-retrocortane 21-phosphate) in 5 parts of chloroform. A few drops of a 0.1 N solution of hydrogen bromide in acetic acid is added, and the resulting solution is stirred while adding thereto, dropwise at room temperature, a solution containing two molecular equivalents of bromine (based on the 9α-fluoro-retrocortane 21-phosphate) dissolved in two parts of glacial acetic acid. The reaction solution is evaporated to dryness in vacuo, and the residual material is triturated with low-boiling petroleum ether, and the insoluble material is recovered and dried to give approximately 0.4 part of 2,4-dibromo-9α-fluoro-3,11,20-triketo-17α,21 - dihydroxy-allopregnane 21-phosphate (sometimes referred to herein as 2,4-dibromo-9α-fluoro-retrocortane 21-phosphate).

0.5 part of 2,4 - dibromo - 9α - fluoro - retrocortane 21-phosphate is heated under reflux with 10 parts of collidine for one hour; the reaction mixture is concentrated to dryness in vacuo, the residue dissolved in water and the solution then passed through a column containing 200 parts of a strongly acidic ion-exchange resin. The resultant solution is lyophilized to give 9α-fluoro-$\Delta^{1,4}$-3,11,20 - triketo - 17α,21 - dihydroxy-pregnadiene 21-phosphate (sometimes referred to herein as 9α-fluoro-retrocortin 21-phosphate).

The 9α - fluoro - 3,11,20 - triketo - 17α,21 - dihydroxy-allopregnane 21-phosphate used as starting material in this example may be prepared as follows: 600 mg. of palladium oxide are added to a suspension of 7.25 g. of $\Delta^4$ - 3,11,20 - triketo - 17α - hydroxy - 21 - acetoxy-pregnene in 600 cc. of methanol. The mixture is reacted with hydrogen at a pressure of about 40 pounds per square inch while maintaining the reactants at about room temperature. The absorption of hydrogen ceases after about one-half hour; the amount of hydrogen absorbed corresponds to one mole. The reaction mixture is filtered, thereby removing the catalyst, and the catalyst is washed thoroughly with chloroform. A few drops of ethanolic hydrogen chloride are added to the combined filtrate and washings, and the resulting solution is evaporated to dryness in vacuo. The residual material is dissolved in chloroform, and the solution is again evaporated to dryness. The residual material is then recrystallized twice from actone to give about 6 grams of substantially pure 9α - fluoro - 3,11,20 - triketo - 17α - hydroxy - 21 - acetoxy-allopregnane (sometimes referred to herein as 9α-fluoro-retrocortane 21-acetate).

5 grams of 9α - fluoro - retrocortane 21 - acetate are dissolved in a mixture of 50 cc. of benzene and 50 cc. of 1.1 N methanolic potassium hydroxide, and the solution is allowed to stand at room temperature for a period of about 10 minutes. The solution is then acidified with acetic acid, the benzene is evaporated in vacuo, and the residual material is recrystallized from ethyl acetate to give substantially pure 9α - fluoro - 3,11,20 - triketo-17α, 21-dihydroxy-allopregnane (sometimes referred to herein as 9α-fluoro-retrocortane).

A mixture of 2 parts of 9α - fluoro - retrocortane and four parts of the dioxolane of mesityl oxide in 15 parts of dry tetrahydrofuran is treated with 0.13 part of concentrated sulfuric acid and stirred at room temperature for about two hours. The mixture is then cooled to 0° C. and allowed to stand for approximately 16 hours. Pyridine is added to neutralize the acid and the product is precipitated by the addition of petroleum ether. The precipitated material is recovered by filtration and recrystallized from ethanol to give substantially pure 9α - fluoro - 3,11,20 - triketo - 17α,21 - dihydroxy - allopregnane 3-ethylene cyclic ketal (sometimes referred to herein as 9α-fluoro - retrocortane 3 - ethylene cyclic ketal).

A mixture of 3.5 parts of 9α - fluoro - retrocortane 3-ethylene cyclic ketal in 24 parts of pyridine is cooled to 0° C. To the cooled mixture is added 14 parts of methane sulfonyl chloride, and the resulting mixture is maintained at 0° C. for three hours. The reaction mixture is then poured into ice water whereupon the product separates as a solid, which is recovered by filtration, dried and recrystallized from acetone to give substantially pure 9α - fluoro - 3,11,20 - triketo - 17α,21 - dihydroxy-allopregnane 3-ethylene cyclic ketal 21-methane sulfonate (sometimes referred to herein as 9α - fluoro - retrocortane 3-ethylene cyclic ketal 21-methane sulfonate).

A mixture of 1.5 parts of 9α - fluoro - retrocortane 3-ethylene cyclic ketal 21-methane sulfonate, 1.1 parts of sodium iodide and 140 parts of ethanol are heated under reflux for approximately 30 minutes. The entire reaction mixture is filtered, and the filtered solution is evaporated in vacuo to about 100 parts. To this concentrated solution are added 100 parts of water, and the aqueous mixture thus obtained is evaporated to give approximately 150 parts of an aqueous suspension. This suspension is filtered, and the solid material is washed with water and dried to give 21 - iodo - 9α - fluoro - 3,11,20 - triketo-17α,21 - dihydroxy - allopregnane 3 - ethylene cyclic ketal (sometimes referred to herein as 21 - iodo - 9α - fluoro-retrocortane 3-ethylene cyclic ketal).

Approximately 0.75 part of 21 - iodo - 9α - fluoro-retrocortane 3-ethylene cyclic ketal and 0.6 part of silver dibenzyl phosphate are suspended in 150 parts of benzene, and water is removed by evaporating the mixture to a volume of 75 parts. The resulting, concentrated benzene mixture is heated under reflux for about 16 hours, and filtered while hot to separate the silver iodide from the benzene solution. The filtered benzene solution is evaporated to a heavy syrup, and is then redissolved in a minimum quantity of benzene—about 4 parts. The resulting benzene solution is then diluted with petroleum ether to effect crystallization of the material which is recovered by filtration and dried to give 9α - fluoro - 3,11, 20 - triketo - 17α,21 - dihydroxy - allopregnane 3-ethylene cyclic ketal 21-dibenzyl phosphate (sometimes referred to herein as 9α - fluoro - retrocortane 3-ethylene cyclic ketal 21-dibenzyl phosphate).

A solution of 0.5 part of 9α - fluoro - retrocortane 3-ethylene cyclic ketal 21-dibenzyl phosphate in 100 parts of ethanol containing two parts of N-methyl morpholine is hydrogenated at 25° C. at atmospheric pressure in the presence of about 0.5 part of pre-reduced palladium oxide catalyst. When hydrogenation is complete, as determined by the quantity of hydrogen (2 moles) taken up, the reaction mixture is filtered to remove the catalyst, and the filtrate, which contains the N-methyl-morpholine salt of 9α - fluoro - retrocortane 3-ethylene cyclic ketal 21-phosphate, is evaporated in vacuo to a syrupy residue.

The syrup is dissolved in water, and the aqueous solution is washed with ethyl acetate and ether to remove impurities insoluble in these organic solvents. The aqueous solution is then evaporated to dryness to give the N-methyl - morpholine salt of 9α - fluoro - 3,11,20 - triketo-17α,21-dihydroxy-allopregnane 3-ethylene cyclic ketal 21-phosphate (sometimes referred to herein as 9α - fluoro-retrocortane 3-ethylene cyclic ketal 21-phosphate).

The 9α-fluoro-retrocortane 3-ethylene cyclic ketal 21-phosphate is dissolved in acetone containing a small amount of dilute aqueous hydrochloric acid, and the resulting solution is heated under reflux for about 15 minutes. The reaction solution is evaporated in vacuo to give 9α - fluoro-3,11,20-triketo-17α,21-dihydroxyallopregnane 21-phosphate (sometimes referred to herein as 9α-fluoro-retrocortane 21-phosphate).

*Example 8*

Fifty parts of reagent glacial acetic acid are added to a solution of 0.5 part of 9α-fluoro-3,20-diketo-11β,17α,21-trihydroxy-allopregnane 21-phosphate (sometimes referred to herein as 9α-fluoro-hydroretrocortane 21-phosphate) in 5 parts of chloroform. A few drops of a 0.1 N solution of hydrogen bromide in acetic acid is added, and the resulting solution is stirred while adding thereto, dropwise, at room temperature, a solution containing two molecular equivalents of bromine (based on the 9α-fluoro-hydroretrocortane 21-phosphate) dissolved in two parts of glacial acetic acid. The reaction solution is evaporated to dryness in vacuo, and the residual material is triturated with low-boiling petroleum ether, and the insoluble material is recovered and dried to give approximately 0.4 part of 2,4-dibromo-9α-fluoro-3,20-diketo-11β,17α,21-trihydroxy-allopregnane 21-phosphate (sometimes referred to herein as 2,4-dibromo-9α-fluoro-hydro-retrocortane 21-phosphate).

0.5 part of 2,4-dibromo-9α-fluoro-hydro-retrocortane 21-phosphate is heated under reflux with 10 parts of collidine for one hour; the reaction mixture is concentrated to dryness in vacuo, the residue dissolved in water and the solution then passed through a column containing 200 parts of a strongly acidic ion exchange resin. The resultant solution is lyophilized to give 9α-fluoro-$\Delta^{1,4}$-3,20-diketo - 11β,17,21 - trihydroxypregnadiene 21 - phosphate (sometimes referred to herein as 9α-fluoro-hydro-retrocortin 21-phosphate).

The 9α - fluoro - 3,20-diketo-11β,17α,21-trihydroxyallopregnane 21-phosphate used as starting material in this example may be prepared as follows: 600 mg. of palladium oxide are added to a suspension of 7.25 g. of $\Delta^4$-3,20-diketo-11β,17α-dihydroxy-21-acetoxy-pregnene in 600 cc. of methanol. The mixture is reacted with hydrogen at a pressure of about 40 pounds per square inch while maintaining the reactants at about room temperature. The absorption of hydrogen ceases after about one-half hour; the amount of hydrogen absorbed corresponds to one mole. The reaction mixture is filtered, thereby removing the catalyst, and the catalyst is washed thoroughly with chloroform. A few drops of ethanolic hydrogen chloride are added to the combined filtrate and washings, and the resulting solution is evaporated to dryness in vacuo. The residual material is dissolved in chloroform, and the solution is again evaporated to dryness. The residual material is then recrystallized from acetone to give about 6 grams of substantially pure 9α-fluoro-3,20-diketo-11β,17α-dihydroxy-21-acetoxy-allopregnane (sometimes referred to herein as 9α-fluoro-hydro-retrocortane 21-acetate).

Five grams of 9α-fluoro-hydro-retrocortane 21-acetate are dissolved in a mixture of 50 cc. of benzene and 50 cc. of 1.1 N methanolic potassium hydroxide, and the solution is allowed to stand at room temperature for a period of about 10 minutes. The solution is then acidified with acetic acid, the benzene is evaporated in vacuo, and the residual material is recrystallized from ethyl acetate to give substantially pure 9α-fluoro-3,20-diketo-11β,17α,21-trihydroxy-allopregnane (sometimes referred to herein as 9α-fluoro-hydro-retrocortane).

A mixture of two parts of 9α-fluoro-hydro-retrocortane and four parts of the dioxylane of mesityloxide in 15 parts of dry tetrahydrofuran is treated with 0.13 part of concentrated sulfuric acid and stirred for about two hours. The mixture is then cooled to 0° C. and allowed to stand for approximately 16 hours. Pyridine is added to neutralize the acid and the product is precipitated by the addition of petroleum ether. The precipitated material is recovered by filtration and recrystallized from ethanol to give substantially pure 9α-fluoro-3,20-diketo-11β,17α,21-trihydroxy-allopregnane-3-ethylene cyclic ketal (sometimes referred to herein as 9α-fluoro-hydro-retrocortane 3-ethylene cyclic ketal).

A mixture of 3.5 parts of 9α-fluoro-hydro-retrocortane 3-ethylene cyclic ketal in 24 parts of pyridine is cooled to 0° C. To the cooled mixture is added 14 parts of methane sulfonyl chloride, and the resulting mixture is maintained at 0° C. for 3 hours. The reaction mixture is then poured into ice water and the solid material which precipitates is recovered by filtration, dried and recrystallized from acetone to give substantially pure 9α-fluoro-3,20-diketo-11β,17α,21-trihydroxy-allopregnane 3-ethylene cyclic ketal 21-methane sulfonate (sometimes referred to herein as 9α-fluoro-hydro-retrocortane 3-ethylene cyclic ketal 21-methane sulfonate).

A mixture of 1.5 parts of 9α-fluoro-hydro-retrocortane 3-ethylene cyclic ketal 21-methane sulfonate, 1.1 parts of sodium iodide and 140 parts of ethanol are heated under reflux for approximately 30 minutes. The entire reaction mixture is filtered, and the filtered solution is evaporated in vacuo to about 100 parts. To this concentrated solution are added 100 parts of water, and the aqueous mixture thus obtained is evaporated to give approximately 150 parts of an aqueous suspension. This suspension is filtered, and the solid material is washed with water and dried to give 21-iodo-9α-fluoro-3,20-diketo-11β,17α,21-trihydroxy-allopregnane 3-ethylene cyclic ketal (sometimes referred to herein as 21-iodo-9α-fluoro-hydro-retrocortane 3-ethylene cyclic ketal).

Approximately 0.75 part of 21-iodo-9α-fluoro-hydro-retrocortane 3-ethylene cyclic ketal and 0.6 part of silver dibenzylphosphate are suspended in 150 parts of benzene, and water is removed by evaporating the mixture to a volume of 75 parts. The resulting, concentrated benzene mixture is heated under reflux for about 16 hours, and filtered while hot to separate the silver iodide from the benzene solution. The filtered benzene solution is evaporated to a heavy syrup, and is then redissolved in a minimum quantity of benzene. The resulting benzene solution is diluted with petroleum ether, and the material which crystallizes from the solution is recovered by filtration and dried to give 9α-fluoro-3,20-diketo-11β,17α,21-trihydroxy-allopregnane 3-ethylene cyclic ketal 2-dibenzylphosphate (sometimes referred to herein as 9α-fluoro-hydro-retrocortane 3-ethylene cyclic ketal 21-dibenzylphosphate).

A solution of 0.5 part of 9α-fluoro-hydroretrocortane 3-ethylene cyclic ketal 21-dibenzylphosphate in 100 parts of ethanol containing 2 parts of N-methylmorpholine is hydrogenated at 25° C. at atmospheric pressure in the presence of about 0.5 part of prereduced palladium oxide catalyst. When hydrogenation is complete, i.e. after 2 moles of hydrogen have been absorbed, the reaction mixture is filtered to remove the catalyst, and the filtrate, which contains the N-methyl-morpholine salt of 9α-fluoro-hydro-retrocortane 3-ethylene cyclic ketal 21-phosphate, is evaporated in vacuo to a syrupy residue. The syrup is dissolved in water, and the aqueous solution is washed with ethyl acetate and ether to remove impurities insoluble in these organic solvents. The aqueous solution is then evaporated to dryness to give the N-methylmorpholine salt of 9α-fluoro-3,20-diketo-11β,17α,21-trihydroxy-allopregnane 3-ethylene cyclic ketal 21-phosphate (sometimes referred to herein as 9α-fluoro-hydro-retrocortane 3-ethylene cyclic ketal 21-phosphate).

The 9α-fluoro-hydro-retrocortane 3-ethylene cyclic ketal 21-phosphate is dissolved in acetone containing a small amount of dilute aqueous hydrochloric acid, and the resulting solution is heated under reflux for about 15 minutes. The reaction solution is evaporated in vacuo to give 9α-fluoro-3,20-diketo-11β,17α,21-trihydroxy-allopregnane 21-phosphate (sometimes referred to herein as 9α-fluoro-retrocortane 21-phosphate).

*Example 9*

A solution of about 4 parts of tertiary butyl-acetyl chloride in 17 parts of dry chloroform is added portionwise to a cold solution of 10 parts of 9α-fluoro-hydro-retrocortin (which may be prepared as described in Example 3 hereinabove, and which has the chemical name $\Delta^{1,4}$-9α-fluoro-3,20-diketo-11β,17α,21-trihydroxy-pregnadiene) in 50 parts of anhydrous pyridine. The resulting solution is allowed to stand at 0 to 5° C. for about 15 hours, and the reaction solution is poured into 300 parts of water. The resulting aqueous mixture is extracted with four portions of chloroform each containing approximately 100 parts. The combined chloroform layers are washed with water, dilute aqueous hydrochloric acid solution, water, 5% aqueous sodium bicarbonate solution, and finally with water. The chloroform extract is dried over magnesium sulfate, and the chloroform is evaporated in vacuo to give a residual oil, which is triturated with alcohol until it crystallizes. This material is recrystallized from ethanol to give substantially pure $\Delta^{1,4}$-9α-fluoro-3,20-diketo-11β,17α,21-trihydroxy-pregnadiene 21-(tertiary butyl-acetate), sometimes referred to herein as 9α-fluoro-hydro-retrocortin 21-tertiary butyl-acetate.

*Example 10*

A solution of about 4 parts of tertiary butyl acetyl chloride in 17 parts of dry chloroform is added portionwise to a cold solution of 10 parts of 9α-fluoro-retrocortin (which may be prepared as described in Example 4 hereinabove, and which has the systematic chemical name $\Delta^{1,4}$ - 9α-fluoro-3,11,20-triketo-17α,21-dihydroxy-pregnadiene) in 50 parts of anhydrous pyridine. The resulting solution is allowed to stand at 0.25° C. for about 15 hours, and the reaction solution is poured into 300 parts of water. The resulting aqueous mixture is extracted with four portions of chloroform each containing approximately 100 parts. The combined chloroform layers are washed with water, dilute aqueous hydrochloric acid solution, water, 5% aqueous sodium bicarbonate solution, and finally with water. The chloroform extract is dried over magnesium sulfate, and the chloroform is evaporated in vacuo to give a residue which is crystallized from alcohol to give $\Delta^{1,4}$-9α-fluoro-3,11,20-triketo-17α,21-dihydroxy-pregnadiene 21-(tertiary butyl-acetate), sometimes referred to herein as 9α-fluoro-retrocortin 21-tertiary butyl-acetate.

Various changes and modifications may be made in carrying out the present invention without departing from the spirit and scope thereof. Insofar as these changes and modifications are within the purview of the annexed claims, they are to be considered as part of my invention.

I claim:
1. 2,4 - dibromo-9-halo-3,20-diketo-11β,17α-dihydroxy-21-lower alkanoyloxy-allopregnane.
2. 2,4 - dibromo - 9α-chloro-3,20-diketo-11β,17α-dihydroxy-21-lower alkanoyloxy-allopregnane.
3. 2,4 - dibromo - 9α-chloro-3,20-diketo-11β,17α,21-trihydroxy-allopregnane 21-acetate.
4. 2,4 - dibromo - 9α - fluoro-3,20-diketo-11β,17α-dihydroxy-21-lower alkanoyloxy-allopregnane.
5. 2,4 - dibromo - 9α-fluoro-3,20-diketo-11β,17α,21-trihydroxy-allopregnane 21-acetate.
6. 2,4 - dibromo-9-halo-3,11,20-triketo-17α-hydroxy-21-lower alkanoyloxy-allopregnane.
7. 2,4 - dibromo-9α-fluoro-3,11,20-triketo-17α-hydroxy-21-lower alkanoyloxy-allopregnane.
8. 2,4 - dibromo-9α-fluoro-3,11,20-triketo-17α,21-dihydroxy-allopregnane 21-acetate.

References Cited in the file of this patent

UNITED STATES PATENTS

| | | |
|---|---|---|
| 2,579,479 | Djerassi et al. | Dec. 25, 1951 |
| 2,590,978 | Kendall et al. | Apr. 1, 1952 |
| 2,735,855 | Djerassi et al. | Feb. 21, 1956 |
| 2,767,199 | Djerassi et al. | Oct. 16, 1956 |
| 2,789,117 | Sarett | Apr. 16, 1956 |
| 2,837,464 | Nobile | June 3, 1958 |
| 2,897,216 | Oliveto et al. | July 28, 1959 |
| 2,957,893 | Herzog et al. | Oct. 25, 1960 |

OTHER REFERENCES

Fieser and Fieser: Natural Products, Related to Phenanthrene, 3rd edition (1949), page 451.